May 9, 1944. J. BAILEY 2,348,591
APPARATUS FOR SKINNING THERMOPLASTIC SHAPES
Filed May 4, 1943 2 Sheets-Sheet 1

Inventor
James Bailey
by Brown & Benham
Attorneys

Witness
W. B. Thayer

Patented May 9, 1944

2,348,591

UNITED STATES PATENT OFFICE 2,348,591

APPARATUS FOR SKINNING THERMOPLASTIC SHAPES

James Bailey, West Hartford, Conn., assignor to Plax Corporation, Hartford, Conn., a corporation of Delaware Application May 4, 1943, Serial No. 485,647

6 Claims. (Cl. 18—1)

This invention relates to apparatus for skinning shapes of organic plastic material to reduce them to accurate dimensions in the final shapes desired and to impart a good finish thereto.

In the production of shapes of thermoplastic materials, such as rods made by molding, casting or extrusion, it is very costly to provide dies or molds for all shapes and sizes which may be required. This expense may be greatly reduced by skinning the shapes to the required dimensions and to the desired final shape and, at the same time, the finish on such shapes may be improved.

The general object of the present invention is to provide a novel die for accomplishng the above purposes.

A further object is to provide a novel die for skinning thermoplastic shapes such that skinning of a shape is effected by alternately flash heating the shape superficially to high temperature and skinning off the highly heated skins thus formed. Thus the skinning is effected in steps.

Another object is to provide a novel skinning die so constructed that the skins of plastic are caused to flow away from the shape being skinned and out of the die in streams which are transverse to the axis of the shape.

Other objects and advantages of the invention will be pointed out in the following specification or will be apparent from the accompanying drawings which illustrate one embodiment of my novel die and in which drawings.

Figure 1:
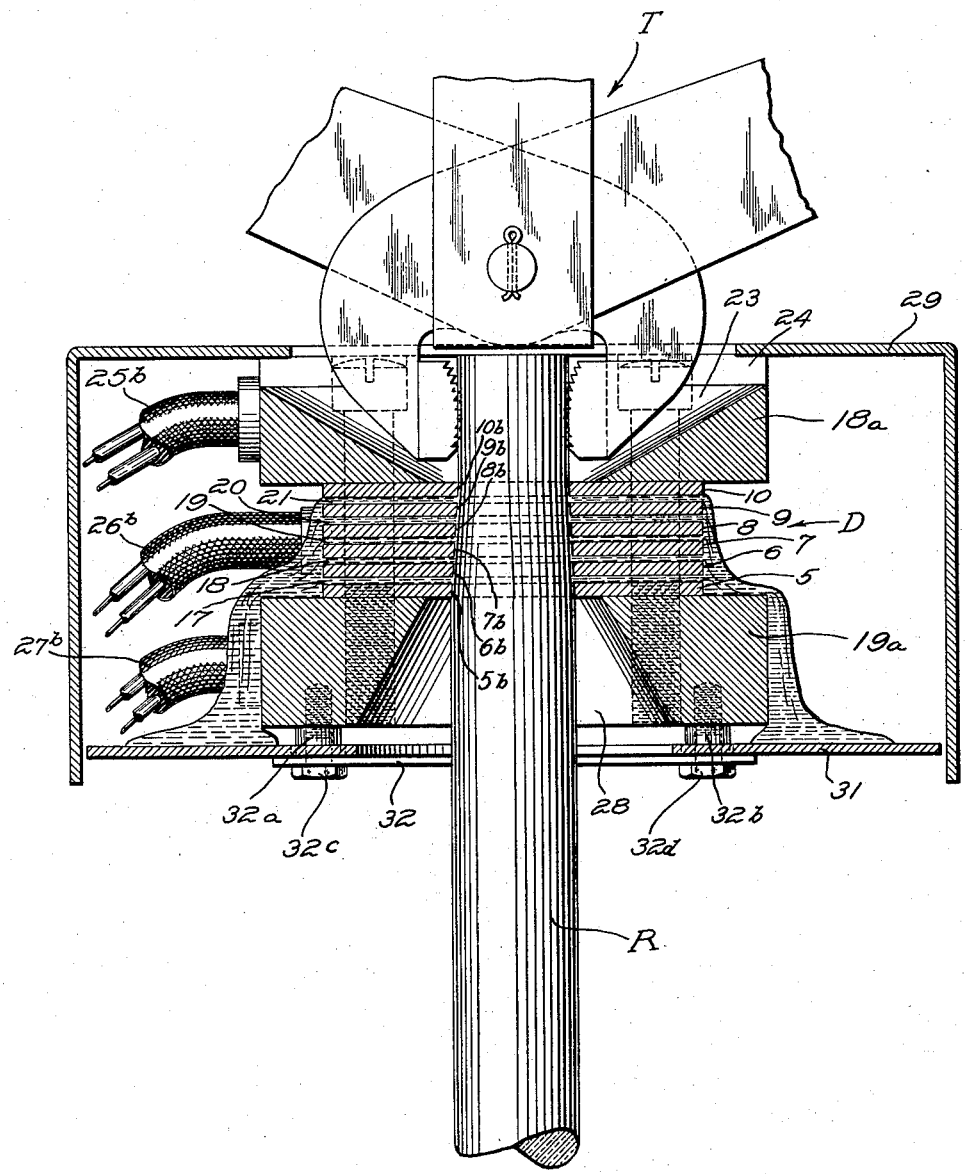
Figure 1 is a view in vertical sectional elevation of the die embodying the invention and illustrating the operation of skinning a shape in steps and discharging the skinned off material through the die.

As shown in the drawings, the illustrated embodiment of the invention comprises a die indicated generally at D through which a rod of organic thermoplastic material, indicated at R, may be drawn by means of tongs T, Fig. 1. Said tongs grip the upper end of the rod R and may be connected to suitable pulling mechanism, not shown, and which may be of such construction as would readily occur to those skilled in the art.

Figure 2:
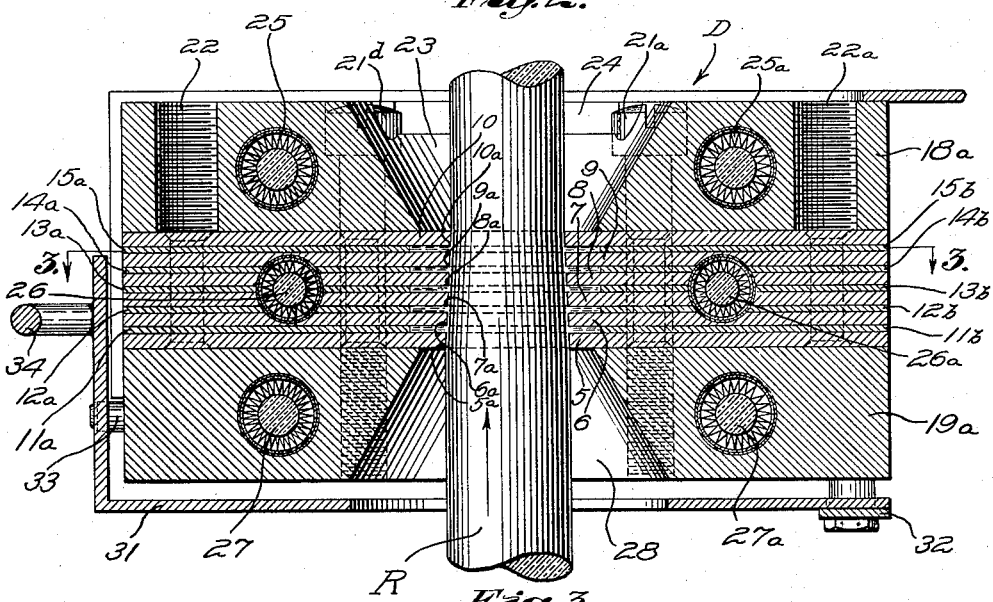
Fig. 2 is a view similar to Fig. 1, but taken at right angles thereto and from which some of the parts shown in Fig. 1 are omitted.
Figure 3:
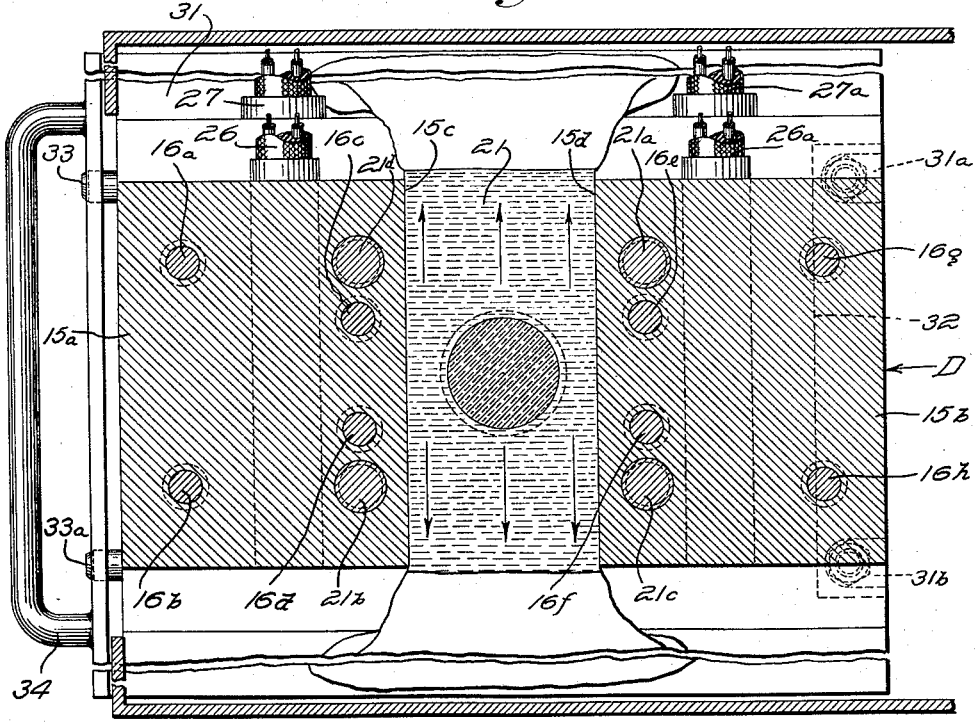
Fig. 3 is a view in horizontal sectional top plan taken approximately on the line 3—3 of Fig. 2.

The die D comprises a plurality of plates 5, 6, 7, 8, 9 and 10, any desired number of which may be provided. These plates are assembled in alternate arrangement with pairs of opposed spacer plates 11a and 11b, 12a and 12b, 13a and 13b, 14a and 14b and 15a and 15b, the spacer plates being interposed between the plates 5 to 10, as best shown in Fig. 2. The die plates and the spacer plates are assembled permanently by means of rivets 16a, 16b, 16c, 16d, 16e, 16f, 16g, 16h, as best shown in Fig. 3. Any other suitable means may be provided to hold the parts in assembled relation. The die plates and spacer plates form a unitary die member.

The die plates 5 to 10 have tapered holes cut therein of gradually decreasing size to provide a main die opening of the desired size and shape and which, considered as a whole, is tapered or reduced in size in the direction in which the rod R is drawn through the die (upwardly in the drawings). This is illustrated in Figs. 1 and 2. The openings cut in the die plates provide cutting edges 5a to 10a on undersides of the die plates. The opening in die plate 5 may be large enough to permit the shape to pass therethrough without being skinned by cutting edge 5a.

The edges 5b to 10b (Fig. 1) of the openings constitute heating surfaces to flash heat the rod R superficially. In this way a hot skin first is formed on the shape by one of the die plates which skin is removed by the cutting edge of the next succeeding die plate, such operations being performed alternately and consecutively.

The respective pairs of spacer plates 11a and 11b, 12a and 12b, etc., are assembled with their innermost opposed edges spaced a substantial distance from the openings in the die plates, as illustrated in Fig. 3, which shows the position of the innermost edges 15c and 15d of the spacer plates 15a and 15b. Thus are formed horizontal channels extending through the die member between the die plates, these channels being clearly shown in Fig. 1 at 17, 18, 19, 20 and 21 and in Fig. 3 at 21. The highly heated skins or skinned off material flow through these channels and out of the die, as shown in Fig. 1.

The die member, composed of the die plates and the spacer plates riveted or otherwise held together as a unit, is clamped between the upper and lower die blocks 18a and 19a by means of screws 21d, 21a, 21b and 21c, Figs. 2 and 3. The die block 18a may be provided with screw threaded openings 22 and 22a to receive bolts, not shown, whereby the entire assembly may be suitably supported by means, not shown.

The die block 18a is recessed, as shown at 23, Figs. 1 and 2, to permit the tongs T to be moved close to the top die plate 10 to grip the top of the rod R. This recess 23, which is outwardly tapered, is longer in the direction shown in Fig. 1 than in the direction shown in Fig. 2 to suit the shape of the tongs T. The die block 18a also is slotted across the top, as shown at 24, for clearance of the die block by the tongs T or parts thereof.

The die D may be heated in any suitable manner. For this purpose I provide electric heaters of the cartridge type. Such heaters are shown at 25 and 25a, Fig. 2, in the top die block 18a on opposite sides of the die opening. Similar heating elements are shown at 26 and 26a in the die member and at 27 and 27a in die block 19a, these also being located on opposite sides of the die opening. The electric connections to these cartridge heaters are shown in Figs. 1 and 3. Thus in Fig. 1 connections for one of the cartridge heaters in die block 18a are shown at 25b, for one of the heaters in the die member at 26 and for one of the heaters in die block 19a at 27b.

Not only is the die block 18a recessed for clearance of the tongs T but to provide ample clearance for the rod R. A similar outwardly tapered recess is provided in the bottom die block 19a, as shown at 28, Fig. 2.

The die may be provided with a suitable cover, such as shown at 29, which is in the form of an inverted box covering and surrounding the die to protect it and which may be held in position by suitable means, not shown. A receptacle for the skinned-off plastic material which flows out of the die at the sides thereof may likewise be provided and such a receptacle is shown at 31. The receptacle may be removably mounted on the die, as by means of a strap 32 bolted to the bottom thereof to receive one end of the receptacle which may be slotted, as indicated at 31a and 31b, to slip over collars 32a and 32b on the bolts 32c and 32d which secure the strap 32 to the bottom of die block 19a. As the receptacle is placed on the strap 32, holes in the opposite side thereof pass over lugs 33 and 33a to hold the receptacle in place. The receptacle may be provided with a handle 34.

In operation the die D is first heated to high temperature. The end of a plastic shape is now pressed into the die opening. This may be done by hand. The end of the rod is rapidly heated, that is, flash heated, and continued pressure causes the end to be consecutively heated and skinned so that the rod may quickly be pushed through the die until its end is in position to be engaged by tongs T. The tongs T are used to pull the full length of the rod through the die.

The heating and cutting actions are such that a thin skin is first flash heated to a high temperature by the heating surface of one die plate and the cutting edge of the next succeeding die plate removes the skin. At the same time the heating surface of the last named die plate forms another heated skin for removal by the next succeeding cutting edge. The axial thrust of the rod or shape develops lateral components of pressure which forces the skins or skinned off material horizontally through the channels 17 to 21, thus causing the skinned off material to flow through and out of the die. The skinned off material flows out of the die at opposite sides thereof and runs down into the receptacle 31. When a substantial quantity of the material has accumulated in the receptacle 31, it is removed and the skinned off material disposed of.

It is preferred to heat the die to a temperature which is relatively high compared to the softening temperature of the organic plastic material. Thus in skinning shapes of polystyrene the die may be heated to a temperature of approximately 580–600° F. That this temperature is extraordinarily high is obvious from the fact that the softening point of polystyrene is said to be 190–250° F. Such intense heating permits the skinning operation to be performed at a relatively high speed, resulting in a good finish or high polish on the shapes and reduces the amount of force necessary to draw the shapes through the die. Although the die may be heated to a relatively high temperature as stated its effect is rather superficial. In other words, the heating does not penetrate very deeply but rather forms a skin of very low viscosity which is immediately removed or peeled from the shape, which beneath the skin, has not been heated very much. This is due to the fact that the flash heated skin is removed quickly as it is heated and before the heat has sufficient time to penetrate very much and to the fact that organic thermoplastic materials have a relatively low heat conductivity. The rods may be cold to the touch upon removal from the die. By heating the rods superficially, distortion of the shapes which are drawn through the die is prevented.

The action of the individual die plates on the shape will depend upon the relative size of the shape and the openings in the die plates. Thus, as stated above, the opening in plate 5 may be large enough to permit the rod to pass therethrough without being skinned. However, in this case, the heating surface 5b may form a highly heated skin for removal by cutting edge 6a of die plate 6. Similarly, die plate 6 may act merely to heat the surface of the shape without skinning it.

The die member, being removably assembled with the die blocks 18a and 19a, may quickly be replaced by a similar die member having a different shape or size of die opening.

It will be understood that changes may be made in the details of the construction of the illustrated embodiment without departing from the scope of the appended claims. Thus, the die may be held in position so that the drawing is performed in any desired direction, horizontally for example, and the die opening may have any desired shape.

Having thus described my invention what I claim is:

1. A thermoplastic skinning die comprising a plurality of die plates having openings therein providing a succession of cutting edges, said openings being so formed and located as to provide a tapered main die opening, means for holding said die plates in spaced relation, and means for heating said die plates.

2. A thermoplastic skinning die comprising a plurality of die members having openings therein so formed and located as to form a tapered main die opening, and pairs of opposed spacer plates between said die members the inner edges of which are spaced from the openings in said members to provide channels from said openings to the exterior of said die for the discharge of skinned off plastic material from said die.

3. A thermoplastic skinning die comprising a plurality of plates having openings therein, the openings in said plates being so shaped and located as to form a tapered main die opening, said openings providing a series of cutting and heating edges, means for holding said die plates in spaced relation, passages between said die plates for the discharge of skinned off plastic material in streams transverse to the axis of said tapered opening, and means for heating said die plates.

4. A thermoplastic skinning die comprising a plurality of die plates, spacer members between said plates, openings formed in said die plates to provide a tapered main die opening, the openings in said plates forming heating and cutting edges thereon, means for heating said die plates whereby a shape of thermoplastic material when passed through said die is alternately heated and skinned, and means for securing said die plates and spacer members together as a unit.

5. A thermoplastic skinning die comprising a plurality of individual die plates, spacer members between said die plates, openings in said die plates shaped and arranged to form a tapered main die opening, the openings in said plates providing heating surfaces and cutting edges, passages between said plates for the discharge of skinned-off plastic from said die, and means for heating said die plates to high temperature.

6. A thermoplastic skinning die comprising a plurality of die plates, spacer members between said die plates, tapered openings in said die plates to form a tapered main die opening, open passages between said die plates for the discharge of skinned off plastic from said die, means for securing said die plates and spacer members together as a unitary die member, die blocks on opposite sides of said die member, means for removably securing said die member between said die blocks, and means for heating said die member.

JAMES BAILEY.